United States Patent Office 3,591,544
Patented July 6, 1971

3,591,544
POLYMERISABLE MONOMERS
John Joseph Hopwood, Glen Waverley, Victoria, Australia, assignor to Balm Paints Limited, Melbourne, Victoria, Australia
No Drawing. Filed July 28, 1969, Ser. No. 845,558
Int. Cl. C08f 3/62, 15/00, 27/04
U.S. Cl. 260—29.6
4 Claims

ABSTRACT OF THE DISCLOSURE

Novel polymerisable monomers, homopolymers and copolymers thereof. The monomers are internal esters of ethylenically unsaturated esters of the formula:

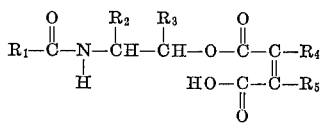

The structure

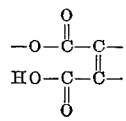

is in the cis-configuration relative to the double bond contained therein.

This invention relates to novel polymerisable monomers and to homopolymers and copolymers thereof.

The polymerisable monomers of the present invention are internal esters of ethylenically unsaturated esters of the formula:

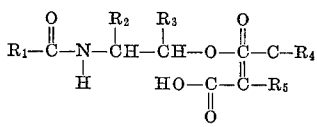

wherein $R_1$ is a branched or linear hydrocarbon chain containing 18 maximium carbon atoms, $R_2$ and $R_3$ are H or a saturated hydrocarbon containing 1–14 carbon atoms, $R_4$ and $R_5$ are H, Cl or $CH_3$ and the structure

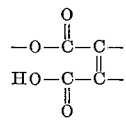

is in the cis-configuration relative to the double bond contained therein.

By an internal ester we mean the product formed by a reaction splitting out water from the parent unsaturated ester accompanied by a loss of carboxyl groups. It would appear, although the invention is not limited by this explanation, that the internal ester assumes a cyclic structure of the form:

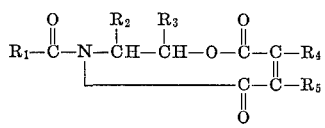

Thus suitable components are alkyl chains in either straight chain or branch-chain isomeric form, e.g. methyl ethyl, n-propyl, iso-propyl, or higher alkyl analogues.

The chains need not, however, be saturated and other useful components are, for example, the hydrocarbon chains occurring in natural oils and fats, e.g. lauryl, myristyl, palmityl, stearyl, oleyl, linoleyl and linolenyl entities. A convenient source of these materials is the group of commercial products known as, for example, linseed, safflower, tall, tung or soya fatty acids, which comprise two or more different hydrocarbon chains.

The polymerisable internal esters may be prepared by the esterification of a suitable primary alcohol with an ethylenically unsaturated dicarboxylic acid or acid anhydride to form the acid-ester, which is concurrently or subsequently dehydrated to provide a monomer of the invention. Suitable unsaturated acids which have the required cis-configuration are maleic, chloro-maleic, dichloro-maleic and citraconic acids. For example, maleic anhydride and N-acetyl ethanolamide may be reacted to form an acid-ester and then further reacted by refluxing in xylene, with azeotropic removal of water to give an unsaturated polymerisable monomer. The intra-molecular reaction which splits out water from the molecule is promoted by heating of the reactants and removal of reaction water, typically at temperatures of the order of 110° C. or greater. Both the initial ester formation and the internal ester formation may be carried out concurrently by adding the primary alcohol and unsaturated acid to an azeotroping liquid and heating it to the selected temperature.

A suitable primary alcohol may be prepared by, for example, the esterification of an alkanolamine under such conditions that there is little if any attack on the primary hydroxyl group and essentially only amide-esters are formed. Alternatively the primary alcohol may be made by a trans-esterification process from an alkanolamine and the methyl ester of, for example, the methyl ester of a fatty acid.

The alkanolamine itself may be prepared by the reaction of an alkylene oxide with a primary amine or ammonia. The nature of the groups $R_2$ and $R_3$ in the above structural formula will then depend on the particular alkylene oxide used, as shown in the following table:

| Alkylene oxide | $R_2$ | $R_3$ |
|---|---|---|
| Ethylene oxide | H | H |
| 1,2-propylene oxide | $CH_3$ | H |
| 2,3-butylene oxide | $CH_3$ | $CH_3$ |
| $C_{16}$-α olefin oxide | H | $CH_3(CH_2)_{13}$ |

In general, we have found that monomers according to the invention can be satisfactorily homopolymerised or co-polymerised with other α,β-ethylenically unsaturated monomers under normal addition polymerisation conditions. Suitable co-monomers are, for example, aromatic substituted ethylenes, e.g. styrene, α-methyl styrene and the "vinyl toluenes"; and
acrylic and methacrylic acids, and their esters with saturated alcohols, e.g. the methyl, ethyl and n-butyl esters.

The homopolymerisation or co-polymerisation is carried out by normal addition polymerisation techniques in the presence of free radical initiators, for example benzoyl peroxide or azodiisobutyronitrile.

Accordingly, we further provide an addition polymer comprising monomer units of internal esters of ethylenically unsaturated esters as hereinabove defined.

Polymers of this type need not, however, be prepared by the direct polymerisation or co-polymerisation of the unsaturated internal ester itself.

For example, a copolymer comprising monomer units of maleic, chloro-maleic, dichloro-maleic or citraconic acids can be post-esterified with a suitable primary alcohol to form the alcohol acid esters in situ and concurrently or subsequently, by azeotroping at an elevated temperature, converting the acid esters to the corresponding internal esters. In fact, when $R_1$ is an unsaturated hydrocarbon chain such as a linolenyl chain, the unsaturation of the chain itself may enter into a free radical initiated polymerisation reaction. To avoid such side-reactions, which can result in gellation of the polymer, we prefer when using this type of unsaturated hydrocarbon component to first prepare a suitable polymer as described above and then esterify it with the unsaturated primary alcohol.

Alternatively, addition polymerisation and formation of units of monomer therein according to the invention may be carried out concurrently. For example, a suitable ethanolamide, styrene and maleic anhydride may be co-reacted in the presence of a free radical initiator under azeotroping conditions to concurrently form the unsaturated internal ester and a copolymer of that ester with styrene.

Polymers according to the invention are suitable for use as film-forming polymers in surface-coating compositions. They may be used in the form of solutions or dispersions in non-aqueous liquids or as aqueous latices.

Certain copolymers comprising monomer of the invention may also be used as solutions or dispersions of colloidal dimensions in aqueous liquids, for which purpose the monomer is co-polymerised with a carboxyl-containing co-monomer, the polymer then being reacted with a water-soluble base, for example ammonia, monoethanolamine, diethanolamine, triethanolamine, N-methyl ethanolamine, N-aminoethyl ethanolamine, ethylene diamine, diethylenetriamine, propylene diamine, diniethylaminoethanol, sodium hydroxide or potassium hydroxide.

To be utilised in this way, the copolymer should have an acid value of the order of 35 mgm. KOH per gm. of polymer or greater. The carboxyl-containing polymers are dissolved or dispersed in the aqueous liquid in the presence of the water-soluble base, with which they may have been pre-reacted or which may be present in solution in the aqueous liquid. The aqueous liquid may be water alone but more frequently it will comprise a minor proportion of a water-soluble organic liquid, e.g. ethylene glycol mono-n-butyl ether, which is known to increase the ease of incorporation of a polymer in an aqueous liquid.

When $R_1$ is an autoxidizable hydrocarbon chain, the monomers are of particular value as a means of introducing autoxidative properties into homopolymers or copolymers of the monomers.

The invention is illustrated by the following examples in which all parts are expressed by weight.

EXAMPLE 1

The maleic acid-ester of N-acetyl ethanolamide is prepared and then converted to a monomer of the invention by splitting out water. The monomer so-formed is shown to homopolymerise.

915 parts of ethanolamide were cooled to below 15° C. and 1682 parts of acetic anhydride were added at a rate such that the temperature of the solution did not rise above 20° C. The solution was then allowed to stand for 2 hours at 15° C., with stirring, then left for 4 days at ambient room temperature.

To the mixture was then added 1470 parts of maleic anhydride, the batch stirred at 70° C. for 3 hours and then stood for 24 hours at ambient room temperature. A total of 50,000 parts of toluene was then used to extract residual acetic acid from the batch by gradual addition thereto and concurrent removal by distillation under reduced pressure (260 mm. and 70° C.).

The N-acetyl ethanolamide ester so-formed was added slowly to 6,000 parts of refluxing xylene until water, which was stripped from the reflux condensate, ceased to be evolved. The batch separated into two layers on cooling, the top layer being withdrawn, concentrated by distillation under reduced pressure and allowed to stand at 15° C. Orange crystals which formed were recrystallised twice from xylene and decolorised with activated charcoal. The final product was a white, crystalline solid which on drying at 50° C. had a melting range of 76.5–79.5° C. An infra-red spectrum showed a band at 840 cm.$^{-1}$ (attributed to maleate unsaturation) a characteristic carbonyl doublet and negligible N-H absorption. The acid value of the product was almost zero, molecular weight 186±15 and the empirical formula from elemental analysis of $$C_8H_9NO_4$$

To 60 parts of methyl ethyl ketone in a reaction vessel were added 9.15 parts of the above crystalline unsaturated monomer and 1.0 part of a 55% paste of benzoyl peroxide in n-butyl benzyl phthalate. The mixture was held at reflux for 7 hours to give a solution of a polymeric material, a film of which showed no characteristic absorption due to ethylenic unsaturation on infra-red analysis. The homopolymer so-produced was precipitated from solution by the addition of methanol, in which the crystalline monomer was soluble.

EXAMPLE 2

Preparation of a copolymer of the polymerisable monomer of Example 1.

The following mixture:

| | Parts |
|---|---|
| Monomer from Example 1 | 9.15 |
| Methyl methacrylate | 5.00 |
| Benzoyl peroxide paste | 2.00 |
| Methyl ethyl ketone | 120.00 | was refluxed gently for 5½ hours. A solution of polymer was formed. Progressive precipitation of polymer by the incremental addition of the above solution to methanol and infra-red analysis of the precipitated fractions showed characteristic absorption bands of both poly-methacrylate and polymerised monomer of Example 1 in each case.

EXAMPLE 3

Preparation of a citraconic anhydride analogue of Example 1.

By the general method of Example 1 a polymerisable monomer of the invention was formed but replacing the 1470 parts of maleic anhydride of that example with 1680 parts of citraconic anhydride. The percentage conversion of the acid-ester to internal ester calculated from the amount of water evolved was greater than 80% by weight.

EXAMPLE 4

Preparation of a copolymer of the monomer of Example 3.

A mixture of 50 parts of a 30% by weight solution of the monomer of Example 3 in xylene, 20 parts of styrene, 50 parts of xylene and 0.5 part of benzoyl peroxide paste were heated to 70–80° C. for 2 hours then held at steady reflux for a further 1 hour. (A viscous solution of polymer was formed).

EXAMPLE 5

Preparation of a monomer of the invention from safflower monoethanolamide. The monomer is homopolymerised.

A mixture of 2940 parts of safflower monoethanolamide, 890 parts of maleic anhydride, 2480 parts of an aliphatic hydrocarbon (boiling range 185–215° C.) and 1000 parts of xylene were heated to reflux in a reaction vessel under a blanket of nitrogen for 1 hour at 120° C. then at reflux at a temperature of from 160–175° C. for a further 7 hours. The degree of conversion of the acid-ester formed to the internal ester was estimated from the amount of water stripped from the reflux condensate at about 85% by weight. Infra-red analysis of the dried product showed a negligible residue of N-H adsorption and the presence of maleic-type unsaturation. The product was a viscous, red liquid after evaporation of solvent.

A mixture of:

| | Parts |
|---|---|
| Liquid monomer (the above red liquid) | 40.4 |
| Benzoyl peroxide paste | 2.0 |
| Methyl ethyl ketone | 120.0 | was heated to reflux in a reaction vessel for 4 hours. A viscous polymer solution, which deposited a tough, rubbery film when allowed to dry on a substrate, was formed.

EXAMPLE 6

Preparation of a copolymer of the polymerisable monomer of Example 5.

To 120 parts of xylene heated to reflux in a reaction vessel was added a mixture of:

| | Parts |
|---|---|
| Liquid monomer of Example 5 | 417 |
| Styrene | 68 |
| Methyl methacrylate | 46 |
| Di-tert-butyl peroxide | 4 | at a constant rate over a period of 5 hours, the reflux temperature rising gradually from 128–143° C. The solids content of the polymer solution so-formed was determined as 48.3% by weight (theoretical, 49.3%) showing almost complete polymerisation of monomer. The solution produced a hard, tough film when allowed to dry on a substrate.

EXAMPLE 7

Preparation of a monomer of the invention from coconut monoethanolamide.

A mixture of:

| | Parts |
|---|---|
| Coconut monoethanolamide | 65.0 |
| Maleic anhydride | 24.5 |
| Xylene | 100.0 | was held at reflux for 5½ hours. The percent conversion to the internal ester as estimated from the amount of water collected from the reflux condensate was approximately 80% by weight.

Characteristic adsorption bands attributed to maleic unsaturation and the virtual absence of N–H or carboxyl absorption were observed by infra-red analysis.

EXAMPLE 8

Preparation of a copolymer of the monomer of Example 7.

A mixture of:

| | Parts |
|---|---|
| Monomer solution of Example 7 | 100.0 |
| Styrene | 10.0 |
| Di-tert-butyl peroxide | 0.5 | was heated at reflux for 45 minutes to give a viscous solution of polymer. A film cast from the solution showed characteristic absorption due to polystyrene and the absence of maleic unsaturation, by infra-red analysis.

EXAMPLE 9

Preparation of a monomer of the invention from safflower monoethanolamide and dichloromaleic anhydride.

A mixture of:

| | Parts |
|---|---|
| Safflower monoethanolamide | 32.4 |
| Dichloromaleic anhydride | 16.1 |
| Xylene | 48.5 | was heated to 70.80° C. with stirring for 2 hours. An addition of 0.2 part of di-tert-butyl peroxide was then made, the temperature raised slowly to reflux and held for 3 hours. An addition of 13 parts of styrene, 1.0 part of di-tert.-butyl peroxide and 37 parts of xylene was cautiously added to the batch over a period of 5 minutes and the solution refluxed for a further 2 hours. A viscous solution of polymer in which both styrene and chlorine was detected by infra-red analysis of a dried sample, was formed.

EXAMPLE 10

Preparation of a polymer of the invention by post-esterification of a pre-formed polymer.

A reaction vessel was charged with a mixture of 58 parts of high-boiling aromatic hydrocarbon and 65 parts of xylene and heated to reflux.

A mixture of:

| | Parts |
|---|---|
| Maleic anhydride | 45.4 |
| N,N-dimethylformamide | 7.6 |
| Xylene | 80.0 |
| Di-tert-butyl peroxide | 4.07 | was added at a uniform rate to the batch over a period of 5 hours. Starting at the same time, a mixture of:

| | Parts |
|---|---|
| Styrene | 67.5 |
| Methyl methacrylate | 48.9 | was added at a uniform rate to the batch over a period of 4 hours and then the mixture refluxed for a further 2 hours.

The mixture was then allowed to cool until reflux ceased then a mixture of:

| | Parts |
|---|---|
| Safflower monoethanolamide | 150.0 |
| High-boiling hydrocarbon liquid | 58.0 |
| Xylene | 64.7 | was added, then refluxing continued for a further 4½ hours.

The efficiency of in situ formation of internal ester monomer units in the polymer was estimated from the amount of water collected from the reflux condensate to be over 60% by weight.

EXAMPLE 11

Preparation of a copolymer according to the invention by concurrent addition polymerisation and internal ester formation.

A mixture of:

| | Parts |
|---|---|
| Maleic acid ester of safflower monoethanolamide | 204.0 |
| High-boiling aromatic hydrocarbon | 132.5 |
| Xylene | 53.4 |
| N,N-dimethyl formamide | 7.6 |
| Di-tert-butyl peroxide | 4.07 |
| Styrene | 59.1 |
| Methyl methacrylate | 56.9 | was added at a uniform rate over a period of 2 hours to 140 parts of refluxing xylene in a reaction vessel. Reflux was continued for a further 2 hours. A viscous solution of polymer was formed. The degree of conversion of acid-ester to internal ester was estimated from the amount of water collected from the reflux condensate to be over 70% by weight.

A dry film of polymer cast on a substrate was hard, clear and slightly yellow in colour.

EXAMPLE 12

Preparation of an analogue of the monomer of Example 1 in which monoethanolamine is replaced by a $C_{16}$-α alkanolamine.

The following were charged to a reaction vessel fitted with a stirrer and reflux condenser:

| | Parts |
|---|---|
| Cetyl-stearyl α-olefin oxide | 50 |
| Xylene | 150 |

The mixture was heated to 45–50° C. and ammonia gas bubbled through until no further change in its infra-red spectra occurred. In particular, the ratio of the 3,300 and 2,900 cm.$^{-1}$ bands was observed to become constant.

Ammonia was removed by bubbling inert gas through the batch for 15 minutes, 60 parts safflower fatty acids methyl ester was added and the batch heated to azeotroping conditions (148° C.) to remove any water.

The batch was cooled to 115° C. and 0.2 part sodium ethoxide added, held at 115-120° C. for 2 hours then solvent removed by vacuum distillation.

Infra-red examination of the product showed it to be substantially a safflower derivative of an alkanol amide in which the alkanol was cetyl-stearyl alcohol.

This material was then reacted with maleic anhydride to give a half ester which was polymerised with styrene to give a copolymer; as follows:

To the above batch was added:

| | Parts |
|---|---|
| Maleic anhydride | 20 |
| Styrene | 20 |
| Di-tert-butyl peroxide | 1 |
| Xylene | 50 | and the reaction allowed to proceed at 125° C. under azeotropic reflux. 0.5 part water was removed over 4 hours indicating internal ester formation.

The resulting polymer showed an infra-red spectra typical of a copolymer of styrene. There was no maleic unsaturation (820 sec.$^{-1}$).

The resulting polymer solution had a viscosity of 2 (Gardner Holdt) and when dried with 0.2% by weight of cobalt octoate (6% metal content) solution a film cast from it dried tack free in ½ hour and petrol resistant in 60 hours.

I claim:
1. As a composition of matter an internal ester of an ethylenically unsaturated ester of the formula:

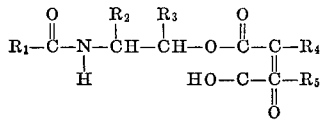

wherein
R$_1$ is a branched or linear hydrocarbon chain containing 18 maximum carbon atoms,
R$_2$ and R$_3$ are H or a saturated hydrocarbon containing 1-14 carbon atoms,
R$_4$ and R$_5$ are H, Cl, or CH$_3$
and the structure

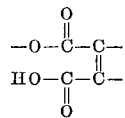

is in the cis-configuration relative to the double bond contained therein.

2. A composition according to claim 1 in which the ethylenically unsaturated ester is an alkanolamide acid-ester of an acid selected from the group consisting of maleic, chloro-maleic, dichloromaleic and citraconic acids.

3. An addition polymer comprising monomer units of internal esters of ethylenically unsaturated esters according to claim 1.

4. A coating composition comprising a film-forming polymer according to claim 3 in which the polymer is present as a solution or dispersion of colloidal dimensions, the said polymer consisting of a carboxyl-containing polymer with an acid value of at least 35 mgm. KOH per gm. which is reacted with a water-soluble base selected from at least one of the group consisting of ammonia, monoethanolamine, diethanolamine, triethanolamine, N-methyl ethanolamine, N-aminoethyl ethanolamine, ethylene diamine, diethylenetriamine, propylene diamine, dimethylaminoethanol, sodium hydroxide or potassium hydroxide.

References Cited

UNITED STATES PATENTS 3,509,111  4/1970  Samour _____ 260—78.5

JOSEPH L. SHOFER, Primary Examiner

J. KIGHT III, Assistant Examiner

U.S. Cl. X.R.

117—124, 132, 161, 167; 260—29.6, 32.4, 32.6, 33.2, 41, 78, 78.4, 78.5, 404, 404.8